(12) United States Patent
Feger et al.

(10) Patent No.: US 7,651,138 B2
(45) Date of Patent: Jan. 26, 2010

(54) COUPLING FOR A FLUID CONDUCTING SYSTEM

(75) Inventors: Axel Feger, Lörrach (DE); Michael Trede, Habsheim (FR); Daniel Utz, Bad Bellingen (DE); Matthias Kübel, Braunschweig (DE)

(73) Assignee: A. Raymond & Cie, Grenoble (FR)

( * ) Notice: Subject to any disclaimer, the term of this patent is extended or adjusted under 35 U.S.C. 154(b) by 118 days.

(21) Appl. No.: 10/589,228

(22) PCT Filed: Mar. 17, 2005

(86) PCT No.: PCT/EP2005/002860

§ 371 (c)(1),
(2), (4) Date: Sep. 6, 2007

(87) PCT Pub. No.: WO2005/106312

PCT Pub. Date: Nov. 10, 2005

(65) Prior Publication Data
US 2008/0111371 A1    May 15, 2008

(30) Foreign Application Priority Data
Apr. 22, 2004    (DE) .................. 10 2004 020 505

(51) Int. Cl.
*F16L 37/08* (2006.01)
(52) U.S. Cl. ..................................... 285/319; 285/305
(58) Field of Classification Search .................. 285/305, 285/308, 319
See application file for complete search history.

(56) References Cited

U.S. PATENT DOCUMENTS

| 4,423,892 | A | * | 1/1984 | Bartholomew | 285/319 |
|---|---|---|---|---|---|
| 4,936,544 | A | * | 6/1990 | Bartholomew | 251/149.6 |
| 5,269,571 | A | * | 12/1993 | Haggard | 285/305 |
| 5,423,577 | A | | 6/1995 | Ketcham | |
| 5,441,313 | A | * | 8/1995 | Kalahasthy | 285/93 |
| 5,542,716 | A | * | 8/1996 | Szabo et al. | 285/305 |
| 5,586,792 | A | * | 12/1996 | Kalahasthy et al. | 285/319 |
| 5,593,187 | A | * | 1/1997 | Okuda et al. | 285/305 |
| 5,683,117 | A | * | 11/1997 | Corbett et al. | 285/24 |
| 5,725,257 | A | * | 3/1998 | Sakane et al. | 285/81 |
| 5,730,481 | A | * | 3/1998 | Szabo et al. | 285/305 |
| 5,951,063 | A | * | 9/1999 | Szabo | 285/303 |
| 6,612,622 | B2 | * | 9/2003 | Andre et al. | 285/305 |

(Continued)

FOREIGN PATENT DOCUMENTS

EP    1158236 A1    11/2001

*Primary Examiner*—James M Hewitt
(74) *Attorney, Agent, or Firm*—Tarolli, Sundheim, Covell & Tummino LLP

(57) ABSTRACT

A coupling for a fluid conducting system comprises an elongated coupling part (1) and a locking part (20), which can be displaced in a direction perpendicular to the longitudinal direction and which can be mounted on the coupling part (1) in a manner that enables it to slide. The guiding of the locking part (20) ensues via detent elements (24, 25) that engage inside guide recesses (13) of the coupling part (1). The locking part (20) can be fixed in a releasing position or in a locking position by the engagement of detent projections (26, 27) inside releasing recesses (18, 19) or inside locking recesses (16, 17). This enables a relatively problem-free operating of the coupling during opening and closing.

18 Claims, 3 Drawing Sheets

U.S. PATENT DOCUMENTS

| | | |
|---|---|---|
| 6,702,335 B2 | 3/2004 | Bahner et al. |
| 6,808,211 B2 | 10/2004 | Hofmann et al. |
| 7,390,025 B2 * | 6/2008 | Pepe et al. .................... 285/93 |
| 7,484,774 B2 * | 2/2009 | Kerin et al. .................. 285/305 |
| 2004/0178629 A1 * | 9/2004 | Yoshida ....................... 285/305 |
| 2005/0087981 A1 * | 4/2005 | Yamada et al. ................. 285/81 |
| 2006/0220380 A1 * | 10/2006 | Yoshino ....................... 285/319 |

* cited by examiner

COUPLING FOR A FLUID CONDUCTING SYSTEM

TECHNICAL FIELD

The invention pertains to a coupling for a fluid conducting system, having a coupling part into which an insertion section of a counterpart can be inserted, and having a locking part which is mounted in movable fashion on the coupling part and which possesses a detent structure which in a detent position interacts with a complementary structure configured on the insertion section for locking the counterpart and the coupling part.

BACKGROUND

Such a coupling is known from DE 10141315 C1. The previously known coupling possesses a coupling part into which an insertion section of a counterpart can be inserted. Also present is a C-~shaped locking part which is mounted on the coupling part so that it can rotate around the longitudinal axis of the coupling. As the detent structure, the locking part possesses sections which are like segments of a circle and which in a detent position interact, through the fact that they engage in recesses configured on the coupling part and the insertion section, with a complementary structure configured on the insertion segment for locking the counterpart and the coupling part in a locking position. When the locking part is rotated around the longitudinal axis of the coupling, the sections which are like segments of a circle slide out of the recesses while bending the locking part upward, and release the insertion section in a release position. To facilitate the rotation, gripping grooves or nubs are present on the outside of the locking part.

When operating the previously known coupling, however, in a certain sense it turned out to be disadvantageous that the release position exhibited a certain instability, since under the effect of a relatively low force on the coupling part, the latter changes over directly from the release position into the locking position in an abrupt fashion. In addition, the transfer of the coupling part from the locking position into the release position by rotating it has not proven to be optimal because of the relatively large amount of space required for doing this. Finally, performing the rotating movement with a locking part having smooth walls, after the gripping grooves or nubs have worn off, for example, is sometimes not without problems.

SUMMARY OF THE INVENTION

The invention is based on the task of suggesting a coupling of the type mentioned at the beginning which is distinguished by improved operation.

With a coupling of the type mentioned at the beginning, this task is inventively solved in that the locking part is configured with two side sections that are parallel to each other, that at least one longitudinal detent element is configured on each of the side sections' insides facing the coupling part, that a latching structure is present in the region of the free ends of the side sections, that the coupling part is configured with guide recesses that lie opposite each other and into which the detent elements engage, and that the coupling part is equipped in the region of one end of the guide recesses with a latching structure that is configured complementary to the detent structure.

Through the inventive configuration of the coupling, the movement of the locking part between the release position and the locking position takes place essentially in a linear direction perpendicular to the longitudinal direction of the coupling so that relatively problem-free operation is possible even in narrow spaces. In addition, this results in the advantage that the release position in particular exhibits relatively high stability against the effects of external forces, so that an unintentional snapping of the locking part into the locking position is made more difficult at the least.

Additional useful developments of the invention are the objects of the subclaims.

BRIEF DESCRIPTION OF THE DRAWINGS

Additional useful developments and advantages arise from the following description of a preferred embodiment of the invention, including references to the figures of the drawing. The following are shown.

DETAILED DESCRIPTION

Figure 1:
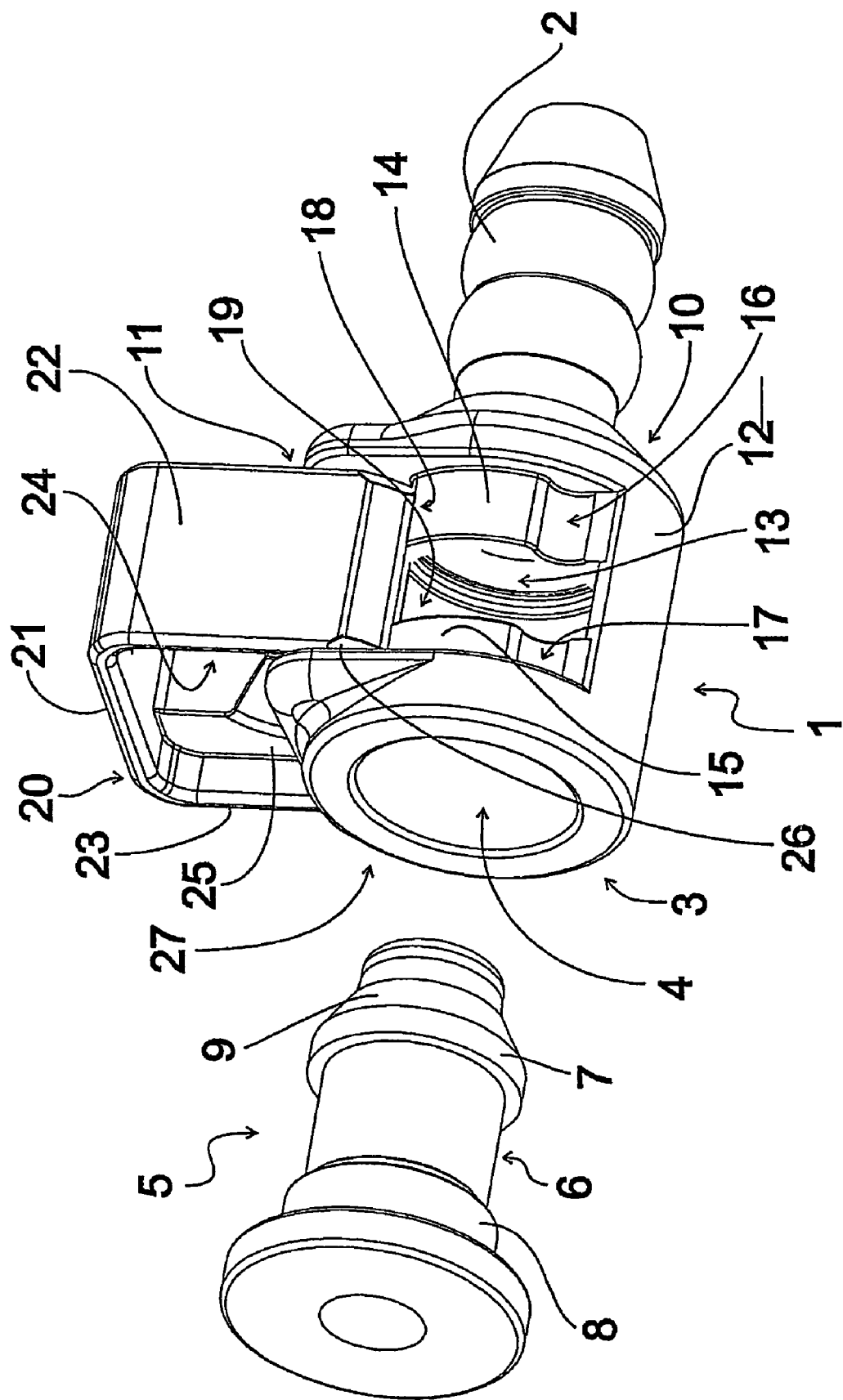
FIG. 1 a perspective view of a preferred embodiment of the invention, having a coupling part and a locking part that is arranged in a release position in the representation according to FIG. 1, and an insertion section of a counterpart that is arranged at a distance from the coupling part, FIG. 2 a perspective view of the embodiment according to FIG. 1 in a cutaway through the coupling part and the locking part arranged in a locking position, and through the insertion section that is inserted into the coupling part, and FIG. 3 a perspective view, partially cut away in the longitudinal direction, of the embodiment according to FIG. 1 and FIG. 2.

FIG. 1 shows a perspective view of an embodiment of an inventive coupling, having a elongated coupling part 1 which possesses a connection fitting 2 on one side. A flexible hose of, for example, a fluid conducting system, not shown in FIG. 1, can be slipped onto the connection fitting 2, which is preferably configured with a cross section that varies in the longitudinal direction and is tapered at the end. At an insertions side 3 that is opposite the connection fitting 2, coupling part 1 is configured with an insertion opening 4 that is round in cross section, into which a counterpart, shown in FIG. 1 at a distance from the coupling part 1 and with an elongated, essentially cylindrical insertion section 5, can be inserted.

The insertion section 5 of the counterpart possesses a circumferential securing recess 6, which is delimited on the edge side by a first edge shoulder 7, which is arranged on the edge side in the region of the free end of the insertion section 5, and a second edge shoulder 8 that lies opposite the first edge shoulder 7. The insertion section 5 is, for example, configured as an end fitting that is placed on a fluid reservoir of the fluid conducting system or that can be connected to one end of another flexible hose of the fluid conducting system. On its end section that faces the insertion side 3 immediately before insertion, when operated properly, into the coupling part 1, the insertion section 5 exhibits an insertion bevel 9 to facilitate insertion into the coupling part 1.

Between the connection fitting 2 and the insertion side 3, the coupling part 1 is configured with a coupling section 10, which is thicker than the connection fitting 2 and in which there are guide recesses 13, which are placed laterally and which extend from a top element 11 to a base element 12, and thus perpendicular to the longitudinal direction of the coupling part 1. Present in the longitudinal direction of the coupling part 1 on both sides of the guide recesses 13 are sliding surfaces 14, 15, which are offset inward relative to the outside of the coupling section 10 and are slightly convex, and which are configured in their end regions facing the base element 12 with locking recesses 16, 17 as a detent structure, and in their end regions facing the top element 11 with the releasing recesses 18, 19 as a releasing structure. The locking recesses 16, 17 and the releasing recesses 18, 19 are aligned in the longitudinal direction of the coupling part 1.

In addition, the preferred embodiment shown in FIG. 1 is equipped with an essentially U-shaped locking part 20, which is detachable mounted on the coupling part 1 and which possesses a top section 21 that is flat on the outside and two side sections 22, 23, which are configured onto the top section 21 at a right angle and which are also flat on the outside. Configured on the inside of each side section 22, 23 are inwardly concave detent elements 24, 25, which are matched to the dimensions of the guide recesses 13 and which engage in the latter. The inside diameter of the locking part 20 in the region of the concavities of the detent elements 24, 25 is slightly smaller than the outside diameter of the insertion section 5 in the region of the securing recesses 6 in order to generate a prestress. Configured as a latching structure on the side sections 22, 23 in the region of the ends of the detent elements 24, 25 that face away from the top section 21 and aligned therefrom in the longitudinal direction of the coupling part 1 are protruding latching projections 26, 27 that are dimensioned for engagement into the locking recesses 16, 17 and the releasing recesses 18, 19.

In the representation according to FIG. 1, the locking part 20 is positioned in a sprung releasing position in which the latching projections 26, 27 are in engagement with the locking recesses 18, 19.

Figure 2:
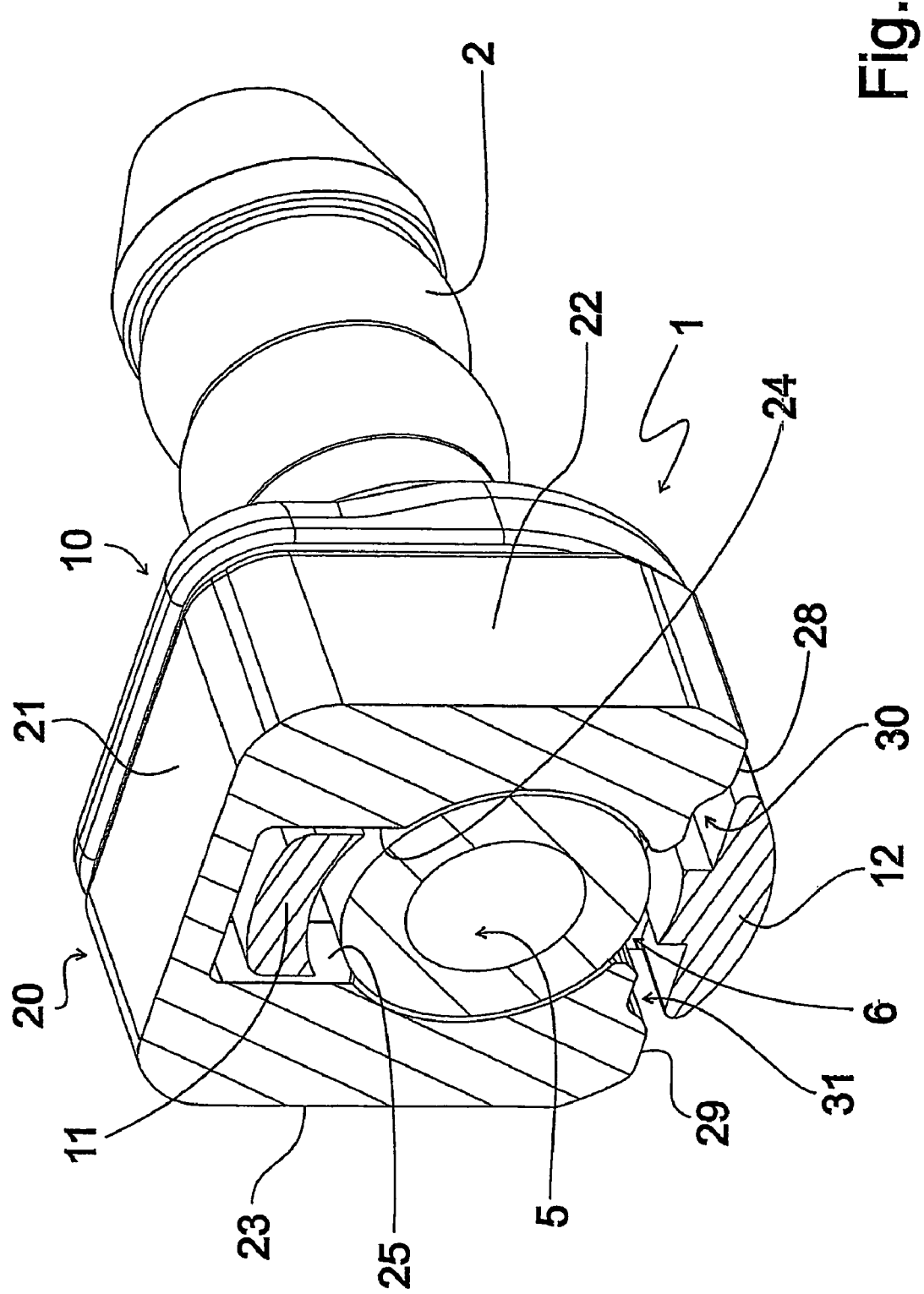

FIG. 2 shows a perspective view of the embodiment according to FIG. 1 in cutaway through coupling part 1 and the locking part 20, which is arranged in a locking position, and through the insertion section 5 that is inserted into the coupling part 1. It can be seen from FIG. 2 that starting from the releasing position shown in FIG. 1, the locking part 20 has assumed the locking position in that, while a force sufficient to overcome the engagement of the latching projections 26, 27 with the releasing recesses 18, 19 is exerted on the top section 21 in the direction of the side sections 21, 22 by means of a fingertip or a tool, for example, with the action of additional force, the insides of the side sections 22, 23 slide along the sliding surfaces 14, 15 and the detent elements 24, 25 engage further into the guide recesses 13 of the coupling part 1. In the locking position, the latching projections 26, 27, which are not visible in FIG. 2, engage in the locking recesses 16, 17, also not visible, so that locking part 20 is also fixed in the locking position.

Figure 3:
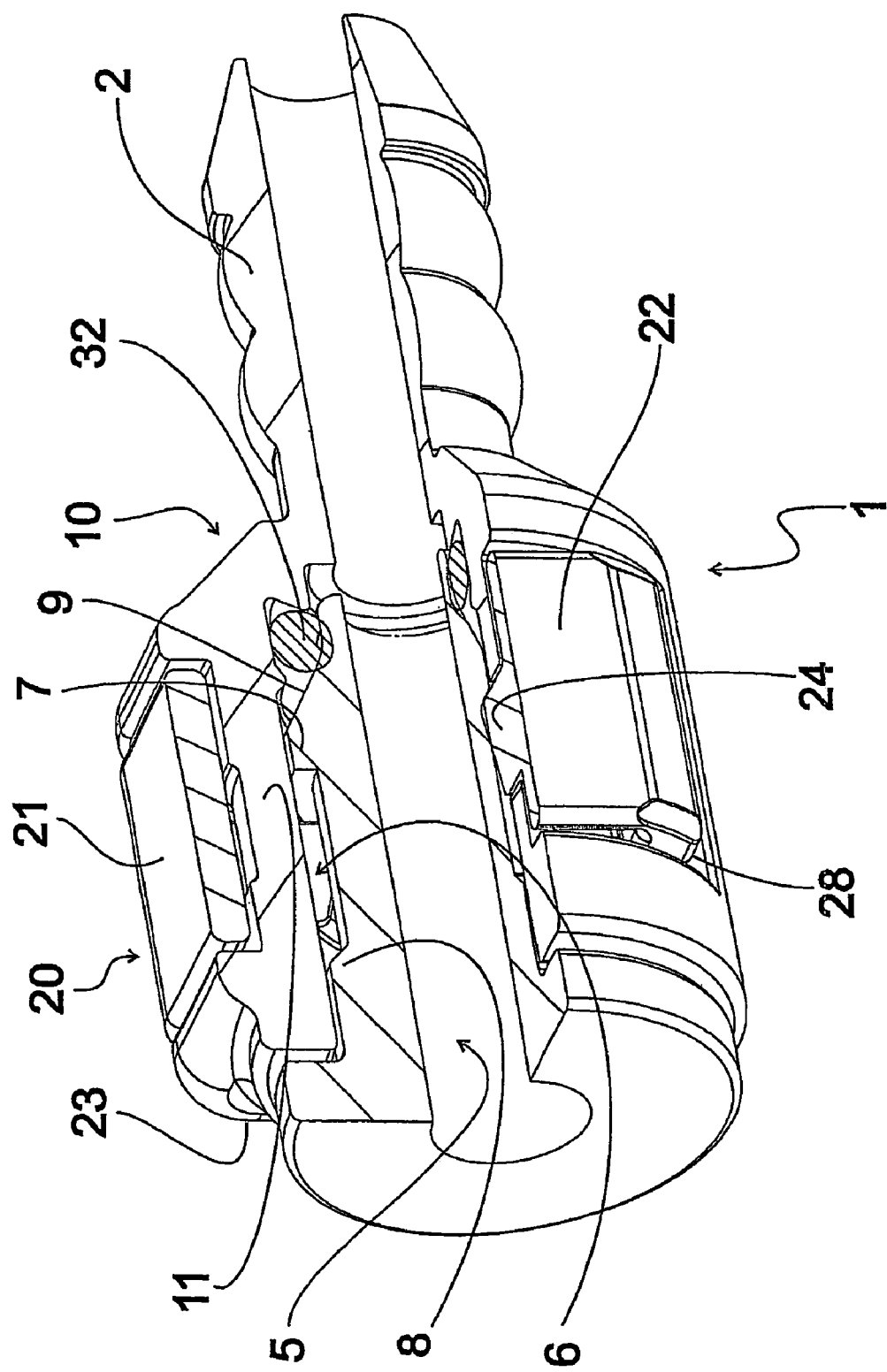

FIG. 3 shows a perspective view, partially cut away in the longitudinal direction in the transition region from one side section 22 into the top section 21, of the embodiment according to FIG. 1 and FIG. 2 with the locking part 20 in the locking position. It can be seen from FIG. 3 that a sealing ring 32 is arranged between the coupling part 1 and the insertion section 5 in the region of the insertion bevel 9 of the insertion section 5 in order to achieve a leakproof connection in the fluid conducting system. It can also be seen from FIG. 3 that the edge sides of the detent elements 24, 25 that face the connection fitting 2 rest on the first edge shoulder 7, which is adjacent to the free end of the insertion section 5, and thus hold the insertion section 5 in the coupling part 1 in an essentially play-free manner.

When the insertion section 5 is inserted into the coupling part 1 with the locking part 20 in the locking position, the detent elements 24, 25 of the locking part 20, which are also advantageously tapered in the direction of the insertion side 3 in the insertion direction, slide onto the insertion taper 9 until the detent elements 24, 25 engage behind the first edge shoulder 7 and the concavities of the detent elements 24, 25 enclose the insertion section 5 in sections in the region of the securing recess 6. The counterpart is thus coupled with the coupling part 1.

To transfer the locking part 20 from the locking position into the releasing position in order to release the insertion section 5, a fingernail or the front end of a screwdriver blade, for example, is applied alternately against the front faces 28, 29, which face away from the top section 21, in the region of the engagement recesses 30, 31 that are provided as a relief structure, in order to release the engagement of the latching projections 26, 27 with the locking recesses 16, 17 by means of a pushing movement on each in the direction of the top section 21.

The invention claimed is:

1. A coupling for a fluid conducting system, the coupling comprising:
    a coupling part into which an insertion section of a counterpart can be inserted, and
    a locking part mounted in movable fashion on the coupling part, the locking part having a detent structure which in a detent position interacts with a complementary structure configured on the insertion section for locking the counterpart and the coupling part,
    the locking part (20) being configured with two side sections (22, 23) that are parallel to each other, each of the two side sections (22, 23) having
    at least one longitudinal detent element (24, 25) on the side sections' (22, 23) insides facing the coupling part (1), and
    a latching structure (26) at the free end of the side section (22) and a latching structure (27) at the free end of the side section (23),
    the coupling part (1) being configured with guide recesses (13) that lie opposite each other and into which the detent elements (24, 25) engage,
    the coupling part (1) is equipped in the region of one end of the guide recesses (13) with a latching structure (16, 17), the latching structure (16) being configured complementary to the latching structure (26) on the side section (22), the latching structure (17) being configured complementary to the latching structure (27) on the side section (23).

2. The coupling according to claim 1, characterized in that in the region of the other end of the guide recesses (13), the coupling part (1) is equipped with a releasing structure (18, 19) that is configured complementary to the latching structure (26, 27) on the side sections (22, 23).

3. The coupling according to claim 2, characterized in that the latching structure (26, 27) on the side sections (22, 23) comprises protrusions, the latching structure (16,17) and the releasing structure (18, 19) on the coupling part (1) comprising recesses that are aligned at a right angle to the detent elements (24, 25) in the longitudinal direction of the coupling part (1).

4. The coupling according to claim 1 characterized in that a relief structure (30, 31) is configured in the region of the free end of the locking part (20).

5. The coupling according to claim 1, characterized in that the locking part (20) exhibits a flat top section (21) that is aligned at a right angle to the side sections (22, 23).

6. The coupling according to claim 1 characterized in that the detent elements (24, 25) are tapered in the direction of an insertion side (3) of the coupling part (1).

7. The coupling according to claim 2, characterized in that a relief structure (30, 31) is configured in the region of the free end of the locking part (20).

8. The coupling according to claim 3, characterized in that a relief structure (30, 31) is configured in the region of the free end of the locking part (20).

9. The coupling according to claim 2, characterized in that the locking part (20) exhibits a flat top section (21) that is aligned at a right angle to the side sections (22, 23).

10. The coupling according to claim 3, characterized in that the locking part (20) exhibits a flat top section (21) that is aligned at a right angle to the side sections (22, 23).

11. The coupling according to claim 4, characterized in that the locking part (20) exhibits a flat top section (21) that is aligned at a right angle to the side sections (22, 23).

12. The coupling according to claim 2, characterized in that the detent elements (24, 25) are tapered in the direction of an insertion side (3) of the coupling part (1).

13. The coupling according to claim 3, characterized in that the detent elements (24, 25) are tapered in the direction of an insertion side (3) of the coupling part (1).

14. The coupling according to claim 4, characterized in that the detent elements (24, 25) are tapered in the direction of an insertion side (3) of the coupling part (1).

15. The coupling according to claim 5, characterized in that the detent elements (24, 25) are tapered in the direction of an insertion side (3) of the coupling part (1).

16. The coupling according to claim 2, characterized in that the coupling part (1) includes sliding surfaces (14, 15) extending along both sides of the guide recesses (13), the latching structure (26, 27) on the locking part (20) being configured to slide along the sliding surfaces (14, 15).

17. The coupling according to claim 16, characterized in that the sliding surfaces (14, 15) include the latching structure (16, 17) at one end and the releasing structure (18, 19) at the other end.

18. The coupling according to claim 17, characterized in that the locking part (20) is slidable along the sliding surfaces (14, 15) from a first position in which the latching structure (26, 27) engages the latching structure (16, 17) on the coupling part (1) to lock the counterpart and the coupling part (1) to a second position in which the latching structure (26, 27) engages the releasing structure (18, 19) on the coupling part (1) to allow movement between the counterpart and the coupling part (1).

* * * * *